UNITED STATES PATENT OFFICE.

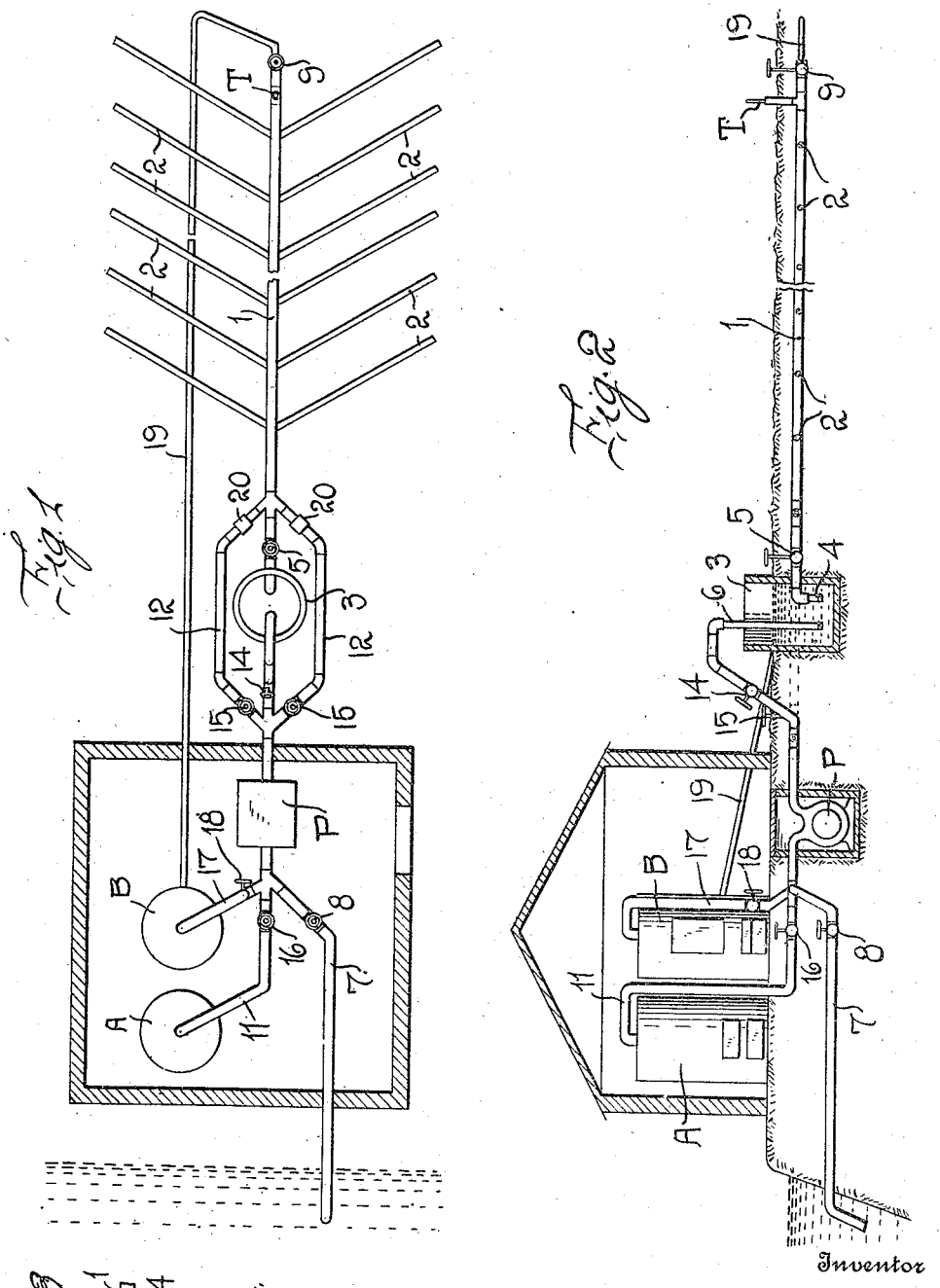

JOHN STEELQUIST, OF PORTLAND, OREGON.

APPARATUS FOR TREATING SOIL.

1,247,166.      Specification of Letters Patent.      Patented Nov. 20, 1917.

Application filed January 15, 1917. Serial No. 142,485.

*To all whom it may concern:*

Be it known that I, JOHN STEELQUIST, a citizen of the United States, residing at Portland, in the county of Multnomah and State of Oregon, have invented certain new and useful Improvements in Apparatus for Treating Soil, of which the following is a specification, reference being had to the accompanying drawings.

This invention relates to apparatus for treating soil and it is an object of the invention to provide an apparatus of this general character having novel and improved means whereby the same may be employed to furnish a supply of water to the soil beneath the surface thereof so that the water may readily reach the roots of the plants and whereby the apparatus may also be employed to drain the soil.

Furthermore it is an object of the invention to provide a novel and improved apparatus of this general character whereby heated water or warm air may be readily delivered to the soil beneath the surface thereof and also whereby fertilizer in solution may be delivered to the soil beneath the surface thereof.

The invention consists in the details of construction and in the combination and arrangement of the several parts of my improved apparatus whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view partly in elevation and partly in section illustrating an apparatus constructed in accordance with an embodiment of my invention, said figure being somewhat of a diagrammatic character;

Fig. 2 is a view partly in side elevation and partly in section of the apparatus as disclosed in Fig. 1;

Fig. 3 is an enlarged fragmentary view partly in section and partly in elevation illustrating the coupling employed in connection with the main drain and the suction end of the pump; and Fig. 4 is a fragmentary sectional view illustrating one of the check valves as employed in connection with each of the by-passes.

As disclosed in the accompanying drawings, 1 denotes a main conduit either porous or perforated and adapted to be positioned a predetermined distance below the upper surface of the soil to be treated, and in communication with said main conduit, 1 are the laterals 2.

3 denotes a sump or reservoir preferably built of concrete and having its bottom positioned below the level of the outer end of the main conduit 1 and having its top terminating a predetermined distance above the surface of the soil, whereby ample room is afforded for drainage water together with sufficient pressure for irrigation. It is also to be understood that the dimensions of the sump or reservoir 3 are to be determined by the size of the tract of land to be treated.

One end portion of the conduit 1 extends into said sump or reservoir 3 and is provided therein with the depending extension 4 terminating in close proximity to the bottom of the sump or reservoir 3, and interposed in said conduit 1 exterior of the sump or reservoir 3 but preferably adjacent thereto, is the valve 5 herein disclosed as of a globe type.

Extending into the sump or reservoir 3 through the top or open end thereof is the piping 6 in which is interposed the pump P which is preferably of a valveless type. Also in communication with the pump P is the lead 7 which leads from a suitable source of water supply such as a stream. The pump may be operated either to draw from the said stream and deliver to the sump 3, or vice versa.

Interposed in the piping 7 is the controlling valve 8 also disclosed herein as of a globe type. The outer end portion of the conduit 1 has also interposed therein a controlling valve 9.

When it is desired to employ my apparatus for the purpose of irrigation, the pump P is caused to operate in such a manner as to substantially fill the sump or reservoir 3 with a supply of water, the valve 9 being closed so that the pressure of the water within the sump or reservoir will cause the requisite flow of the water within the conduit 1 and the laterals 2.

When it is desired to drain the soil the depending extension 4 of the conduit 1 and the adjacent end portion of the pipe 6 may be connected by the detachable coupling 10 and the pump P caused to operate to create a suction through the pipe 6. It will also be understood that when the pipe 6 is disconnected from the extension 4 the pump P may be caused to withdraw from within the sump or reservoir 3 any water which may drain of its own accord into said sump or reservoir 3.

A denotes a hot air heater of any ordinary or preferred type and which has extending therefrom the lead pipe 11 in communication with the pipe 7 at a point intermediate the pump P and the valve 8 so that the warm air generated by the heater A may be forced by the pump P through the main conduit 1 and the laterals 2. When the heated air is employed the valve 8 is closed.

It is also to be noted that the pipe 6 and the conduit 1 have coacting therewith the by-passes 12 arranged at opposite sides of the sump or reservoir 3 and which are in communication with the conduit 1 at a predetermined point in advance of the valve 5. The pipe 6 has interposed therein a controlling valve 14 adapted to be closed when the apparatus is employed in connection with the heated air. It is also of particular advantage to have the by-passes 12 provided with the controlling valves 15 and to interpose within the lead pipe 11 in advance of its communication with the pipe 6 a controlling valve 16.

B denotes a boiler for heating the water which may be of any ordinary or preferred type and in suitable communication with the boiler B is the lead 17 also leading to the piping 7 and interposed in said lead 17 is the controlling valve 18. In communication with the outer end of the conduit 1 is the return pipe 19 leading to the boiler B. When the heated water is employed the valve 9 is opened so that the requisite circulation of the water may be permitted.

T denotes a thermometer carried by the outer end portion of the conduit 1 so that the temperature of the soil may be readily and conveniently determined. It is also of advantage to interpose in the by-passes 12 the check valves 20 whereby retrograde movement through said by-pass is prevented.

In view of the foregoing it is thought to be self-evident that my improved apparatus provides effective means for the treating of soil and in practice I prefer that the pump be operated by electrical energy so that the same may be caused to work during the night hours when the rates are reasonable on account of no other material demand. The air within the heater A is adapted to be warmed for immediate use, while the water within the boiler B is to be heated in large quantities so that the same may be used preferably on the following day.

It is thought to be self-evident that with my improved apparatus for treating soil, a liberal supply of air may be pumped into the soil through the main conduit 1 and the laterals 2 after all excess water has been drained off and that by the use of gases delivered to the main conduit 1 from a suitable source of supply all fungi and animal life may be destroyed which would otherwise be detrimental to the growing plants. When required warm air may be applied to the soil for both heating and aerating the same.

It will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. An apparatus of the class described including a conduit having laterals in communication therewith, a reservoir into which one end portion of the conduit extends, a piping extending into the reservoir, a pump interposed in said piping, a source of fluid supply, a lead in communication with said source and the piping, a valve interposed in the piping intermediate the connection between the lead and said piping, a by-pass in communication with the piping and with the conduit and arranged exterior of the reservoir, a valve interposed in the conduit intermediate the reservoir and the point of communication between the by-pass and the conduit, and a valve interposed in the piping intermediate the reservoir and the point of communication between the piping and the by-pass.

2. An apparatus of the class described including a conduit having laterals in communication therewith, a reservoir into which one end portion of the conduit extends, a piping extending into the reservoir, a pump interposed in said piping, a source of fluid supply, a lead in communication with said source and the piping, a valve interposed in the piping intermediate the connection between the lead and said piping, a by-pass in communication with the piping and with the conduit and arranged exterior of the reservoir, a valve interposed in the conduit intermediate the reservoir and the point of communication between the by-pass and the conduit, a valve interposed in the piping intermediate the reservoir and the point of communication between the piping and the by-pass, and a check valve interposed in the by-pass for preventing retrograde flow therethrough.

In testimony whereof I hereunto affix my signature in the presence of two witnesses.

JOHN STEELQUIST.

Witnesses:
B. C. HOLT,
S. F. WILSON.

Copies of this patent may be obtained for five cents each, by addressing the "Commissioner of Patents, Washington, D. C."